US011731566B2

(12) United States Patent
Kovarik

(10) Patent No.: US 11,731,566 B2
(45) Date of Patent: Aug. 22, 2023

(54) SNOWBOARD CARRIER FOR A VEHICLE

(71) Applicant: Joseph E. Kovarik, Englewood, CO (US)

(72) Inventor: Joseph E. Kovarik, Englewood, CO (US)

(*) Notice: Subject to any disclaimer, the term of this patent is extended or adjusted under 35 U.S.C. 154(b) by 0 days.

(21) Appl. No.: 17/709,748

(22) Filed: Mar. 31, 2022

(65) Prior Publication Data

US 2022/0219615 A1 Jul. 14, 2022

Related U.S. Application Data

(63) Continuation-in-part of application No. 17/221,306, filed on Apr. 2, 2021, now Pat. No. 11,292,395, which is a continuation of application No. 16/358,757, filed on Mar. 20, 2019, now Pat. No. 10,967,804, which is a continuation of application No. 15/444,619, filed on Feb. 28, 2017, now Pat. No. 10,239,465.

(60) Provisional application No. 62/303,675, filed on Mar. 4, 2016.

(51) Int. Cl.
*B60R 9/04* (2006.01)
*B60R 9/10* (2006.01)
*B60R 9/048* (2006.01)

(52) U.S. Cl.
CPC ............... *B60R 9/10* (2013.01); *B60R 9/048* (2013.01)

(58) Field of Classification Search
CPC ... B60R 9/048; B60R 9/12; B60R 9/08; Y10S 224/917; A63C 11/028; E05B 73/007; Y10T 70/411

USPC ................. 224/917, 315, 323–324
See application file for complete search history.

(56) References Cited

U.S. PATENT DOCUMENTS

| | | |
|---|---|---|
| 639,517 A | 12/1899 | Butcher |
| 3,865,245 A | 2/1975 | Lieb |
| 4,126,228 A | 11/1978 | Bala |
| 4,226,351 A * | 10/1980 | Biermann ................. B60R 9/12 224/325 |
| 4,524,893 A | 6/1985 | Cole |
| 4,747,529 A * | 5/1988 | Hinderaker ............... B60R 9/12 248/302 |
| 5,323,915 A | 6/1994 | Fortune |
| 5,582,044 A * | 12/1996 | Bolich ................. E05B 73/007 224/315 |
| 5,692,659 A | 12/1997 | Reevesh |
| 6,439,397 B1 | 8/2002 | Reeves |
| 6,601,712 B2 | 8/2003 | Dean et al. |
| 6,761,297 B1 | 7/2004 | Pedrini |
| 7,222,763 B2 | 5/2007 | Pedrini |
| 7,896,175 B1 * | 3/2011 | Corr ..................... A63C 11/028 211/86.01 |
| 8,496,148 B2 | 7/2013 | Farney et al. |
| 8,961,172 B2 | 2/2015 | Dupray et al. |
| 9,499,223 B2 | 11/2016 | Oviatt |
| 10,059,276 B2 | 8/2018 | Phillips |

(Continued)

*Primary Examiner* — Adam J Waggenspack
(74) *Attorney, Agent, or Firm* — Sheridan Ross P.C.

(57) ABSTRACT

A snowboard carrier for a vehicle allows a snowboard to be mounted to a vehicle via the employment of at least one rotatable member for rotating relative to a snowboard from an open position, which provides access to operably position the snowboard, to a closed position, wherein the at least one rotatable member extends over the top surface of the snowboard, securing the snowboard to the snowboard carrier.

20 Claims, 4 Drawing Sheets

(56) References Cited

U.S. PATENT DOCUMENTS

| | | |
|---|---|---|
| 10,239,465 B2 | 3/2019 | Kovarik |
| 10,967,804 B2 | 4/2021 | Kovarik |
| 11,292,395 B2 | 4/2022 | Kovarik |
| 2011/0123942 A1 | 5/2011 | Rudman et al. |
| 2015/0026935 A1 | 1/2015 | Prescott |

\* cited by examiner

SNOWBOARD CARRIER FOR A VEHICLE

RELATED APPLICATIONS

This application is a continuation-in-part of U.S. patent application Ser. No. 17/221,306, filed Apr. 2, 2021 (now U.S. Pat. No. 11,292,395, issued Apr. 5, 2022), which is a continuation of U.S. patent application Ser. No. 16/358,757, filed Mar. 20, 2019 (now U.S. Pat. No. 10,967,804, issued Apr. 6, 2021), which is a continuation of U.S. patent application Ser. No. 15/444,619, filed Feb. 28, 2018 (now U.S. patent Ser. No. 10/239,465, issued Mar. 29, 2019), which is a non-provisional application of U.S. Provisional Application Ser. No. 62/303,675 filed on Mar. 4, 2016. The entire disclosure of the prior application is considered to be part of the disclosure of the accompanying application and is hereby incorporated by reference.

FIELD OF THE INVENTION

The present invention is directed to a snowboard carrier for a vehicle that allows a snowboard (as well as a surfboard, windsurf board, etc.) to be mounted to a vehicle via the employment of at least one rotatable member for rotating relative to a snowboard from an open position, which provides access to operably position the snowboard, to a closed position, wherein the at least one rotatable member extends over the top surface of the snowboard, securing the snowboard to the snowboard carrier for transport by the vehicle.

BACKGROUND OF THE INVENTION

Vehicle roof carrier systems for transporting winter sport gear and summer sports gear have become increasingly popular. Such carrier systems typically comprise cross bars onto which ski carrier clamps can be mounted for fixing the winter sport gear to the vehicle roof carrier system. Prior art systems typically include an elongate base part and an elongate top part hingedly coupled thereto to allow clamping of winter/summer sport gear between the same. The elongate top part is rotated into an open position about a hinge and the winter/summer sport gear to be transported, a pair of skis, a snowboard, a surfboard, etc. is placed on an upper surface of the elongate base part and the elongate top part is brought into a closed position in which it is interlocked with the elongate base part, thus fixedly holding the sports gear between the elongate base part and the elongate top part.

Prior art ski and snowboard carrier clamps are constructed to be a certain height and consequently a comparatively large surface oriented in the driving direction of the vehicle. Therefore, the wind resistance of such prior art ski/snowboard carrier clamps is comparatively large. Moreover, given the long and narrow configurations of snowboards and surfboards, problems arise during their transport on a vehicle. For example, snowboards are quite expensive and have edges that must be properly maintained. Without proper storage during transportation, the edges of snowboards can be easily damaged. Accordingly, there is a need for a device that can transport at least one snowboard or surfboard externally located on the vehicle to eliminate the need to transport the snowboard within the passenger compartment or trunk of a vehicle.

Surfboards and windsurfing boards are very popular for carrying out water sports upon the ocean and other bodies of water. Unfortunately, surfboards and windsurfing boards are very bulky and difficult to transport. Typically, they are too large to fit into a traditional vehicle and are often times too big to fit into the back of a standard pickup truck. For this reason, various apparatuses have been developed for carrying surfboards upon a vehicle. The most common apparatus utilizes a traditional vehicle roof rack that includes a pair of laterally extending cross bars which extend across the vehicle's roof. A surfboard is typically placed upon the rack and then affixed to the cross bars using clamping levers, straps or ropes. Preferably, these racks include some sort of padding to minimize any sort of damage to the surfboard.

Accordingly, there is a need for an improved carrier for snowboards, surfboards, windsurfing boards, etc. that securely and easily reversibly affixes such boards to a vehicle.

SUMMARY OF THE INVENTION

The present invention in a particular embodiment is directed to a snowboard carrier for a vehicle that includes a rotatable member for rotating from an open position, which provides access to a snowboard, to a closed position, wherein at least one arm associated with the rotatable member inhibits the snowboard from moving vertically. Throughout this description, reference made to a "galaxy clamp" is intended to generally refer to various embodiments of the present invention, reflecting the spinning movement of the mechanism that permits closed and open configurations that respectively secure snowboards to a vehicle and release snowboards from such a secure arrangement. A first portion of the rotatable member of the galaxy clamp is secured within a recess of a body of the carrier, and rotates therein when the rotatable member rotates between the open position and the closed position. The rotatable member includes two opposed snowboard retaining arms that move from an open position, where the snowboard retaining arms provide snowboard access for positioning the snowboard on the carrier, and when in the closed position, secure the snowboard by the rotatable members rotation over the top surface of the snowboard. The rotatable member has an axis of rotation that is perpendicular to a bottom surface of the snowboard. Preferably, the snowboard carrier has a resilient component selected from the group consisting of a spring and an elastomeric member so as to permit biasing the snowboard retaining arms in the closed position. Also preferably, the carrier includes a lock associated with the rotatable member. In one such embodiment, a push-pin and aperture arrangement is employed. The shape and the curve of the snowboard retaining arms are preferably adjustable to suit a particular snowboard design and the retaining arms preferably rotate in a circular plane. The arms may be angled at an upward angle of between about 10 to 60 degrees and are generally configured to restrain the snowboard from moving either vertically or horizontally when in the closed position.

Various embodiments of the present disclosure are set forth in the attached figures and in the detailed description as provided herein and as embodied by the claims. It should be understood, however, that this Summary section may not contain all of the aspects and embodiments claimed herein. For example, while emphasis has been made on snowboards, it should be understood that the present invention can be employed to convey surfboards, windsurf boards and similar items in line with the structures and functions as described herein. Additionally, the disclosure herein is not meant to be limiting or restrictive in any manner, and is directed to be understood by those of ordinary skill in the art. Moreover, the present disclosure is intended to encompass and include obvious improvements and modifications of embodiments presented herein. Additional advantages of the present disclosure will become readily apparent from the following discussion, particularly when taken together with the accompanying drawings.

DETAILED DESCRIPTION OF THE INVENTION

Figure 1A:
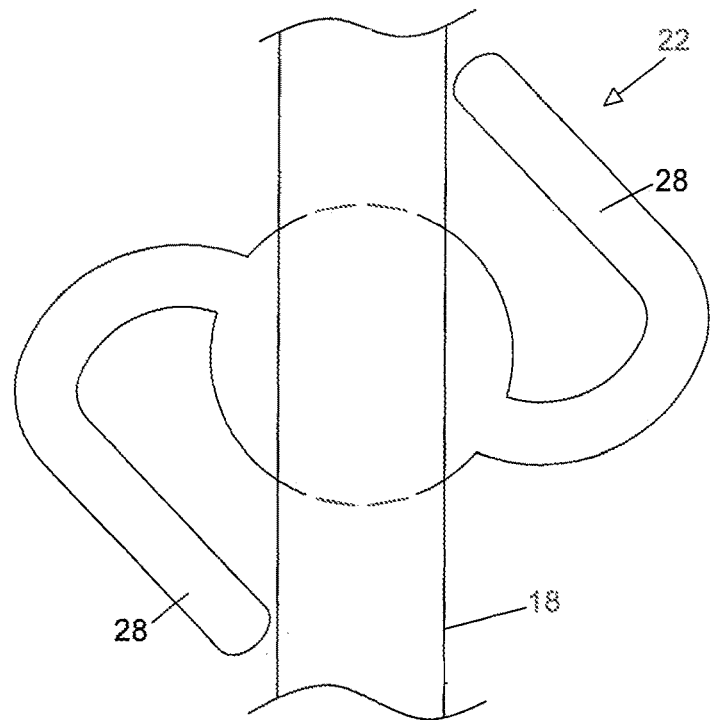
FIGS. 1A and 1B are depictions of a galaxy clamp in an open position where a snowboard can be accepted and in a closed position that entrains a snowboard.
Figure 1B:
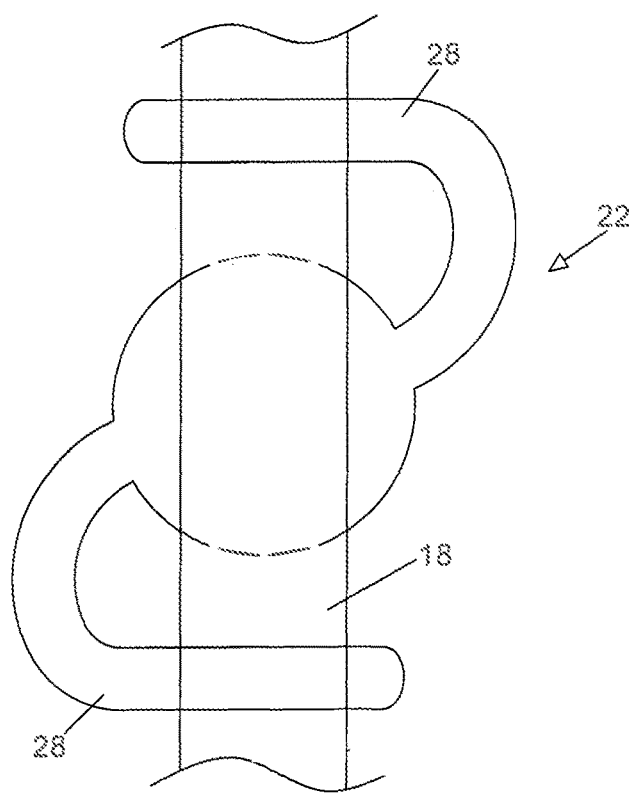
Figure 2:
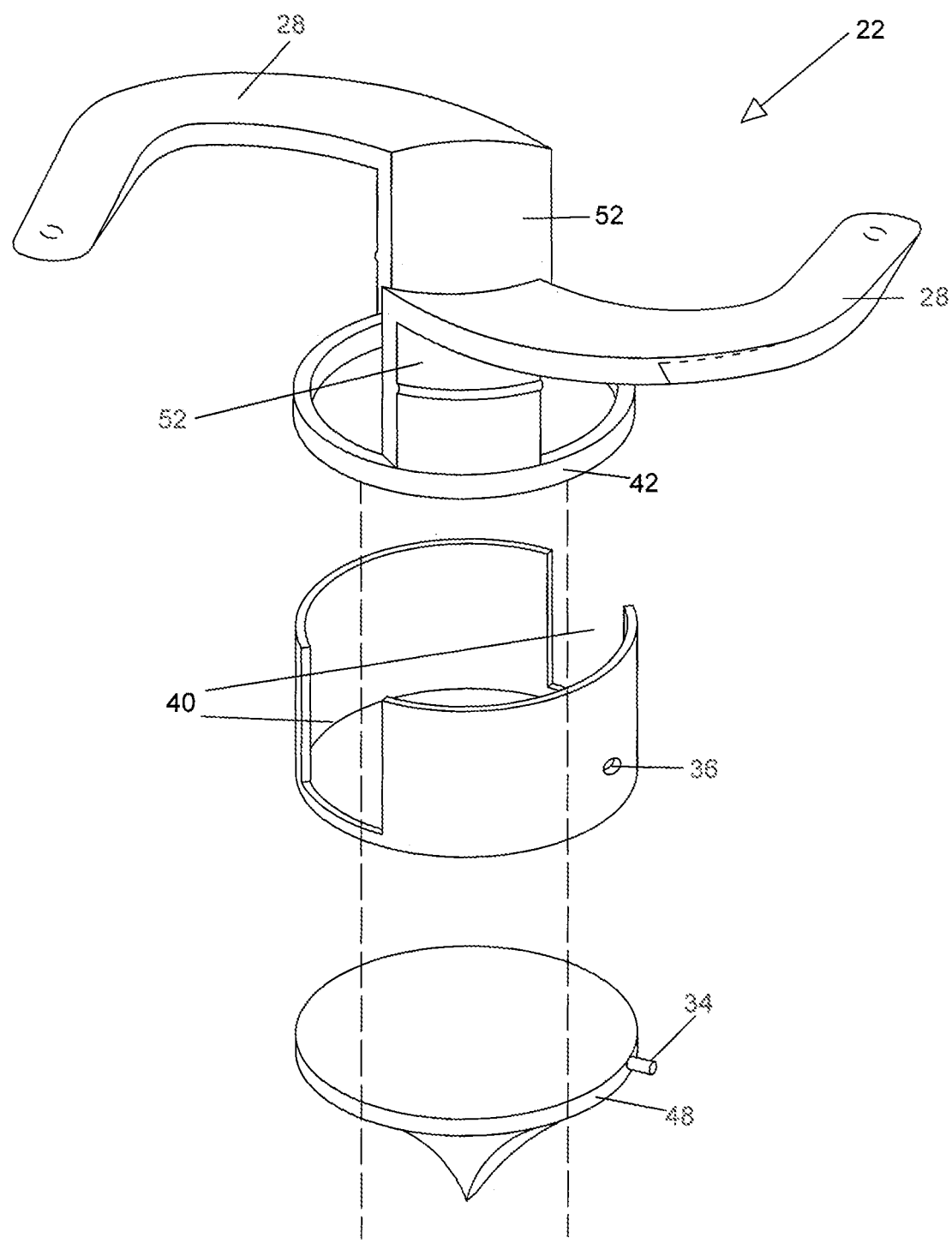
FIG. 2 is an exploded view of one embodiment of a galaxy clamp that employs a finger turning mechanism to rotate the galaxy arms between a closed and open position, with a push pin feature to lock the clamp at a predetermined position.
Figure 3:
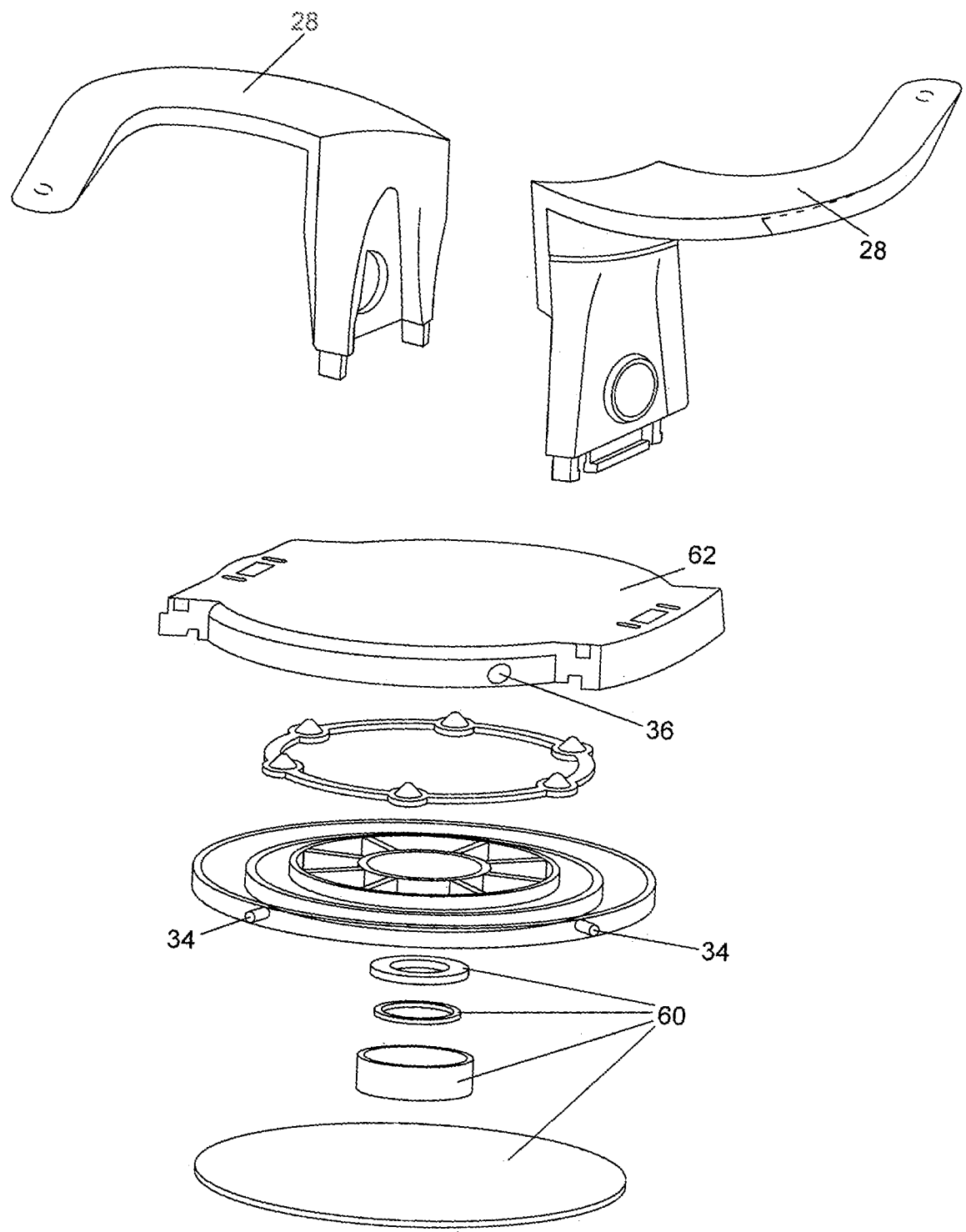
FIG. 3 is an exploded view of one embodiment of a galaxy clamp on a lazy-susan platform and with a push pin feature to lock the clamp at a predetermined position.

In certain embodiments, particularly related to reversibly attaching items that are planar in nature, such as skis and snowboards, the employment of a modified galaxy clamp is used to secure such items, especially in situations where a vehicle 12 is without an existing factory installed roof rack. A galaxy clamp can therefore be provided on a vehicle, so as to secure such planar items in a fashion in a unique way.

While the galaxy clamp 22 may be made from various materials, preferably light weight but sturdy material is preferred, such as ABS or another thermoplastic and thermoset material that have characteristics similar to ABS such as polypropylene, high-strength polycarbonates, and/or blended plastics, may be used instead of ABS.

The galaxy clamp 22, in one embodiment, is especially configured for transporting a snowboard, and includes a Lazy Susan-like 60 component that permits the clamp arms 28 to rotate, with steel or hard plastic ball-bearings being used to facilitate rotation of the clamp 22 between engaging 30 and disengaging 32 positions. Thus, a turntable 62 to allow rotation of movement of the galaxy clamp 22 to facilitate reversible engagement of skis, snowboards, etc. is provided, but without the need for a separate factory installed roof racking system. Instead, the galaxy clamp 22 can be attached, e.g. via and adhesive or by being strapped onto the roof of a vehicle 12 using straps extending from and connected to the galaxy clamp 22 on each side thereof, with the other ends of the straps being connected to the roof/door-closing regions.

To comply with written description and enablement requirements, the following are incorporated by reference in their entireties such that one of skill in the art will appreciate the various components involved and how such prior art systems can be modified in accordance with and in view of the guidance provided by the present specification: U.S. Pat. Nos. 7,222,763 and 6,761,297 to Pedrini; U.S. Pat. No. 6,601,712 to Dean et al.; U.S. Pat. No. 8,961,172 to Dupray; 2011/0123942 to Rudman et al.; U.S. Pat. No. 8,496,148 to Farney et al.; and 20150026935 to Prescott. The invention can be referred to as a "galaxy clamp" 22, due to its appearance of a spinning galaxy with curved arms 28, and certain embodiments include a central circular portion 48 that has two extending, curved arms 28 that are configured so that upon rotation of the circular portion 48, the arms move to secure the top portion of a snowboard to hold it in place, both from further vertical and horizontal movement, such that it is retained and secured by the arms 28 entrapping the snowboard 18. The snowboard 18 may be placed within a recess 40 within which the galaxy clamp 22 circular portion 48 resides within, with the snowboard 18 able to be placed in such recess 40 only when the galaxy arms 28 are rotated out of the way 32, such that the recess 40 is fully accessible for the entry and exit of the snowboard 18 within the recess 40.

With respect to the various so-called galaxy clamp 22 embodiments, the columns 52 should preferably have a width that is less than about ⅓ of a semi-circular section of the otherwise circular aperture into which the galaxy clamp 22 winged arm structure rotates. The narrowness of the column 52 thus permits the arms 28 associated with the clamp 22 to rotate between a position that in one position accepts a snowboard in a retaining recess 40 (prior to the snowboard being clamped) and a position where the snowboard 18 is entrained by the clamp, with opposing arms being rotated over the top of the snowboard. To permit adequate space for the rotation of the arms 28, the curved width of the column 52 is in proportion to the diameter of the circular recess within which the curved columns sit. If the column 52 is too wide, then the ability of the open arm position is limited, and thus maintaining the column 52 in a narrow configuration permits a wider range of motion, and thus, a larger space between the open arms 28 to accept a wider width of items to be enclosed therein. In particular embodiments, the column portion of the arm (i.e. the portion that extends vertically within the circular recess of the clamp device) is comprised of a relatively slender but strong and rigid member, with the remainder of the arm portion 28 (i.e. the arm that bends and that is in contact with the item to be encompassed by the clamp) being substantially wider, such that the above referenced slender portion within the circular recess of the galaxy device provides a maximum of space between the open arms 28, while the thicker width arms provide more surface area to contact with the items to be constrained by the clamp 22.

In certain embodiments of the present invention, the width of the column is less than about 90 degrees of the 180 degree semi-circular expanse of the round aperture that accepts the portion of the Galaxy clamp 22. In other embodiments, the column 52 is less than about 30 degrees of the 180 degree semi-circular expanse of the round aperture, thus permitting more room for the arms to rotate and to accept items having a larger width.

In other embodiments, the clamp 22 that secures the snowboard 18 is adjustable such that different sized snowboards can be accommodated, such as by having compressible material on the jaws so that when pressed by the jaws against the snowboard, such material compresses to conform to the outer surfaces of the snowboard and yet holds the snowboard firmly within the clamp structure.

In one embodiment of the present invention, a galaxy clamp is configured to secure a snowboard. In such embodiment, the galaxy clamp 22 has a far broader base and the arms are sized so that in an open position, a snowboard can be laid flat on top of the clamp 22, and when the arms are then rotated, the snowboard is held between the arms in a closed position. In preferred embodiments, the arms 28 have a compressible foam layer that can compress against the surface of the snowboard when being rotated, thus maintaining the snowboard in a secure position when the clamp 28 is in a closed position 30. For example, closed cell foam arm-contacting sleeves can be provided to ensure that the snowboard is firmly retained on the vehicle 12 when the arms are in a closed position. While preferred embodiments of such a snowboard claims are provided with such sleeves as a integral component of the arms 28, in other embodiments, the sleeves can be reversibly slid onto the arms 28 such that when snowboards are stacked on top of each other, for example, the thickness of the sleeve can be selected to provide the desired level of compressible foam, all with the intent to secure the snowboards to the vehicle 12 without damage to the board, but in a manner that provides an owner thereof with the ability to simply rotate the galaxy clamp 22 mechanism to secure a snowboard, Preferably, two galaxy clamps 22 are employed to secure a snowboard, one employed and attached to the vehicle 12 (e.g. such as onto an existing car rail system) approximately ¼ to ⅓ from the respective tips of the length of the snowboard. Still other embodiments involve the use of a single galaxy clamp 22 that is configured for securement of a snowboard with a single rotating clamping mechanism. In one such embodiment, the arms 28 of the galaxy clamp 22 are preferably thicker in width and are configured with board contacting surfaces that ensure that the board, once within the galaxy clamp 22 in a closed position, is held securely and without danger of detaching from the vehicle. Typically, this is achieved with a galaxy rack system that is in a horizontal position in relation to the roof top of a vehicle 12, but it can be mounted in various other orientations. The arms 28 are preferably at least about 3 inches wide, more preferably about 4 inches wide, and have compressible or rotatable features, e.g. ball bearings, etc., such that the arms are able to rotate over the snowboard so that the board is secured in a snug relationship on the vehicle 12 (e.g. such that vehicle 12 speed and wind associated with the same will not cause the board to chatter or become detached from the car, but at the same time will cause no damage to the surface of the snowboard.

Also preferably, the carrier 22 includes a lock associated with the rotatable member 48. In one such embodiment, a push-pin 34 and aperture 36 arrangement is employed. In others, a retention recess 40 that has side portions 42 is adjacent a snowboard 18.

Figure 4:
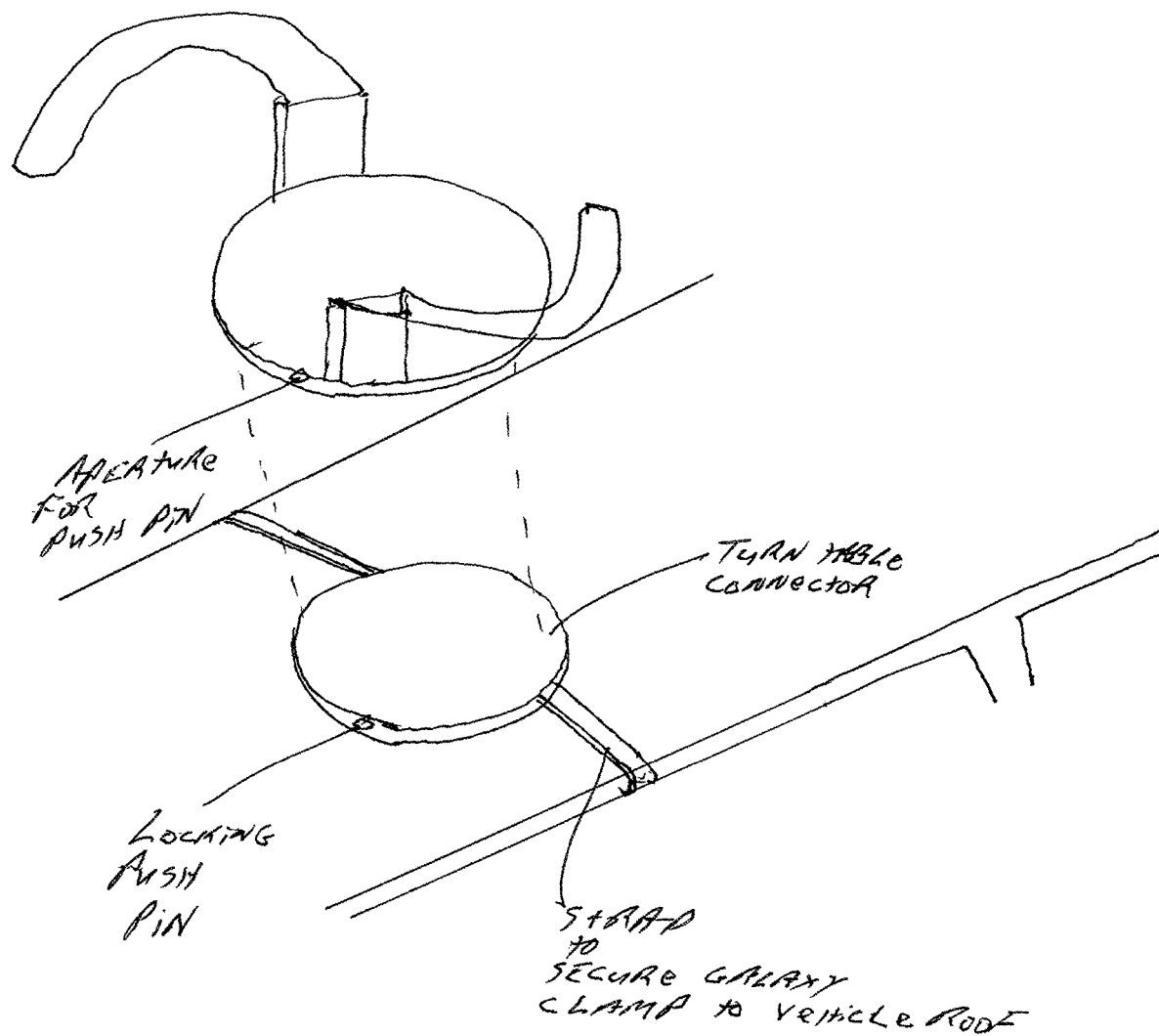
FIG. 4 is a perspective view of a galaxy clamp with a turn table connector and a locking push-pin configuration that is suitable to retrain a snowboard on the roof of a vehicle, with strap(s) provided to secure the galaxy clamp to the vehicle.

As one of skill in the art will appreciate, while the snowboard securement has been described in some detail, other objects can similarly be secured to a vehicle 12 by employing the galaxy clamp 22 as described herein, and such methods and systems are therefore intended to be part of the present invention. For example, but in no terms limiting in this regard, one can employ appropriately configured galaxy clamps 22 for securing windsurfers, masts, surfboards, kayaks, skis, fishing equipment, etc. as well as compartments intended to be placed on the top of a vehicle 12 to itself contain a variety of items, such as luggage, etc. In such later embodiment, galaxy clamps 22 can be employed to secure certain pre-defined "bars" on the bottom portion of such a carrier compartment such that several clamps 22 can be used that are accessible to a user by a twisting/turning mechanism on the bottom-most portion of the galaxy clamp, with such twisting/turning mechanism operatively connected to the rotating column structure so that the arms 28 can be reversibly positioned between open 32 and closed 30 positions. The galaxy clamps 22 themselves may be attached to an existing vehicle 12 (the roof of which is partially pictured in FIG. 4) rack by straps or other securement mechanisms.

One of skill in the art will appreciate that, from the guidance provide herein, it is straightforward to achieve adjustability of the devices as described to accommodate various different sized items to be carried on the carrier. For example, the arms of the galaxy clamp embodiments can be adjustable in various fashions, such as by making them telescoping or slidably associated with internal portions thereof, such that, for example, fat snowboards can be accommodated. The width, length, sizes, etc. of various components as described herein can be not only selected for particular carrying purposes, e.g. to accommodate the dimensions of a snowboard or skis, but can further be rendered adjustable by well-known design features to custom fit the clamps as described herein for particular uses, items, bikes, etc.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention. Those skilled in the art will appreciate that the conception upon which this disclosure is based, may readily be utilized as a basis for designing of other structures, methods and systems for carrying out the several purposes of the present invention. It is important, therefore, that the claims be regarded as including any such equivalent construction insofar as they do not depart from the spirit and scope of the present invention.

What is claimed is:

1. A snowboard carrier for a vehicle, comprising:
a rotatable member for rotating from an open position, which provides access to a snowboard, to a closed position, wherein at least one arm associated with said rotatable member inhibits the snowboard from moving vertically;
wherein a first portion of the rotatable member is secured within a recess of a body, and rotates therein when the rotatable member rotates between the open position and the closed position;
wherein the rotatable member includes two opposed snowboard retaining arms that move from the open position, wherein the snowboard retaining arms provide snowboard access for positioning the snowboard when in the open position, and secure the snowboard by the rotatable member when in the closed position,
said rotatable member having an axis of rotation that is perpendicular to a bottom surface of the snowboard.

2. The snowboard carrier as set forth in claim 1, further comprising a resilient component selected from the group consisting of a spring and an elastomeric member, said resilient component biasing the snowboard retaining arms in the closed position.

3. The snowboard carrier as set forth in claim 1, further comprising a lock associated with the rotatable member.

4. The snowboard carrier as set forth in claim 1, wherein one of a shape and curve of the snowboard retaining arms are adjustable to suit a particular snowboard design.

5. The snowboard carrier as set forth in claim 1, wherein the snowboard retaining arms rotate in a circular plane.

6. The snowboard carrier as set forth in claim 1, the snowboard retaining arms are angled at an upward angle of between about 10 to 60 degrees.

7. The snowboard carrier as set forth in claim 1, wherein the snowboard retaining arms are angled.

8. The snowboard carrier as set forth in claim 1, wherein the snowboard retaining arms restrain the snowboard from moving either vertically or horizontally when in said closed position.

9. The snowboard carrier as set forth in claim 1, wherein one of a shape and curve of the snowboard retaining arms are adjustable to suit a particular snowboard design.

10. A snowboard carrier for a vehicle that secures a snowboard, comprising: at least one rotatable member for rotating relative to a snowboard having a top and a bottom surface, said at least one rotatable member movable from an open position, which provides access to operably position the snowboard, to a closed position, wherein the at least one rotatable member extends over the top surface of the snowboard, wherein the at least one rotatable member includes at least two opposed snowboard retaining arms that move between said open position and said closed position, said at least one rotatable member having an axis of rotation that extends perpendicular to the snowboard's top surface, and wherein said snowboard retaining arms comprise extending, curved arms configured so that upon rotation of the rotatable member into the closed position, the snowboard retaining arms extend across the top surface of the snowboard, securing the snowboard to the snowboard carrier.

11. The snowboard carrier as set forth in claim 10, further comprising a resilient component selected from the group consisting of a spring and an elastomeric member, said resilient component biasing the snowboard retaining arms in the closed position.

12. The snowboard carrier as set forth in claim 10, further comprising a push-pin lock associated with the rotatable member.

13. The snowboard carrier as set forth in claim 10, wherein one of a shape and a curve of the snowboard retaining arms are adjustable to suit a particular snowboard design.

14. The snowboard carrier as set forth in claim 10, wherein the snowboard retaining arms rotate in a circular plane.

15. The snowboard carrier as set forth in claim 10, the snowboard retaining arms are angled at an upward angle of between about 10 to 60 degrees.

16. The snowboard carrier as set forth in claim 10, wherein the snowboard retaining arms are angled.

17. The snowboard carrier as set forth in claim 10, wherein the snowboard retaining arms restrain the snowboard from moving either vertically or horizontally when in said closed position.

18. The snowboard carrier as set forth in claim 10, wherein one of a shape and curve of the snowboard retaining arms are adjustable to suit a particular snowboard design.

19. A snowboard carrier for a vehicle that secures a snowboard to a vehicle, comprising:

a rotatable member for rotating on a circular plane relative to a snowboard, said snowboard having a top surface and a bottom surface, said rotatable member movable from an open position, which provides access to operably position the snowboard, to a closed position, wherein the rotatable member covers a portion of the top surface of the snowboard; wherein the rotatable member includes at least two opposed snowboard retaining arms that move between said open position and said closed position, the snowboard retaining arms restraining the snowboard from moving either vertically or horizontally when in said closed position, said rotatable member having an axis of rotation being perpendicular to the top surface of the snowboard, and a resilient component selected from the group consisting of a spring and an elastomeric member, said resilient component biasing the snowboard retaining arms in the closed position.

20. The snowboard carrier as set forth in claim 19, further comprising a resilient component selected from the group consisting of a spring and an elastomeric member, said resilient component biasing the snowboard retaining arms in the closed position.

* * * * *